United States Patent [19]

Kundig

[11] Patent Number: 4,474,592
[45] Date of Patent: Oct. 2, 1984

[54] APPARATUS FOR PRODUCING LIQUID PARA-HYDROGEN

[75] Inventor: Andres Kundig, Stafa, Switzerland

[73] Assignee: Sulzer Brothers Ltd., Winterthur, Switzerland

[21] Appl. No.: 459,195

[22] Filed: Jan. 19, 1983

[30] Foreign Application Priority Data

Oct. 20, 1982 [CH] Switzerland .......................... 6107/82

[51] Int. Cl.³ .............................................. F25J 1/02
[52] U.S. Cl. ......................................... 62/37; 423/649
[58] Field of Search ................. 423/648 R, 649; 62/9, 62/11, 40, 38, 39, 21, 37

[56] References Cited

U.S. PATENT DOCUMENTS

| 2,937,076 | 5/1960 | Class et al. ........................ 423/649 |
| 3,557,566 | 1/1971 | Van der Born et al. ................. 62/9 |
| 3,828,564 | 8/1974 | Spies et al. ................................. 62/9 |

*Primary Examiner*—Frank Sever
*Attorney, Agent, or Firm*—Kenyon & Kenyon

[57] ABSTRACT

The apparatus for preparing liquid para-hydrogen from normal hydrogen has a reservoir for the liquid para-hydrogen. A gas space of the reservoir communicates via a line with the suction side of an ejector. The ejector extracts the para-hydrogen vapor evolved by heating and returns it to the reservoir in the form of liquid para-hydrogen.

4 Claims, 1 Drawing Figure

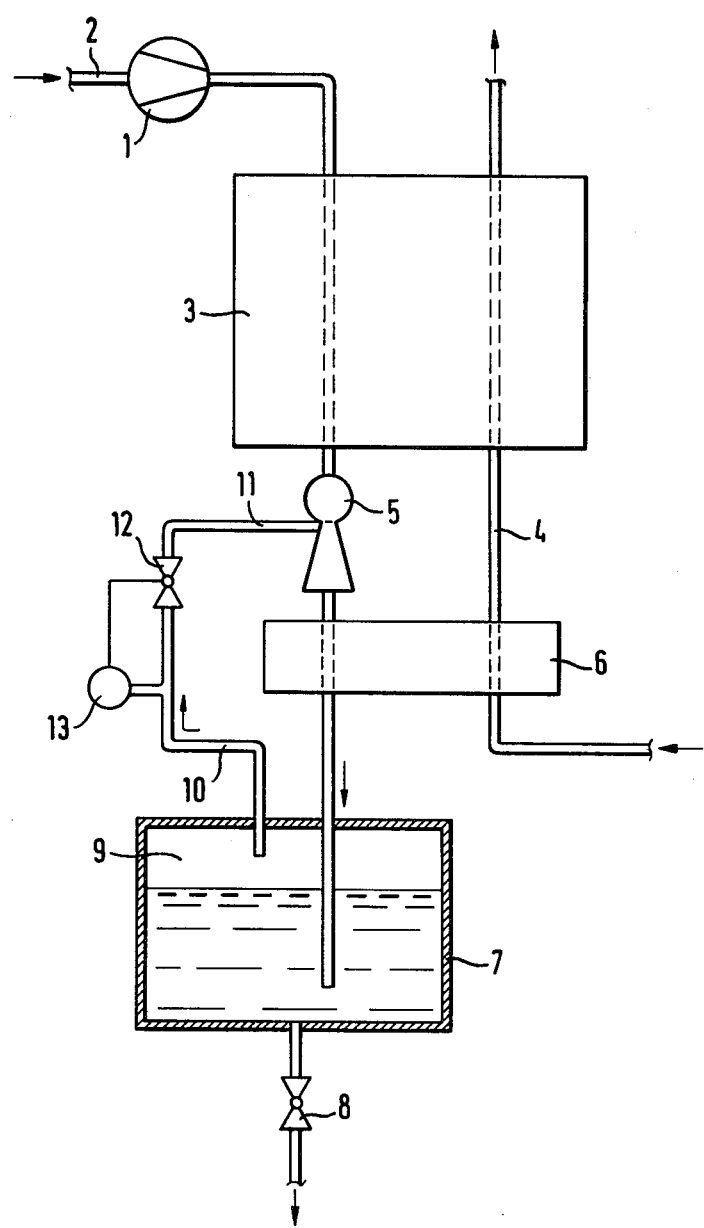

APPARATUS FOR PRODUCING LIQUID PARA-HYDROGEN

This invention relates to an apparatus for producing liquid para-hydrogen. Heretofore, it has been known to provide various types of devices for producing liquid para-hydrogen. For example, one known apparatus includes a compressor for compressing a flow of normal hydrogen gas, a cooling means for cooling the compressed hydrogen gas, catalysts for converting the normal hydrogen into para-hydrogen and an expander for at least partial liquefaction of the cooled hydrogen gas. In addition, the cooling means has been used for liquefying the residual hydrogen vapor while a reservoir is provided for receiving the liquid hydrogen.

If the temperature of the liquid hydrogen in the reservoir is to remain constant, the vapor which evolves as a result of external heating must be extracted. The simplest solution for this is to have the compressor intake the vapor and to mix the vapor with the ordinary hydrogen to be liquefied and to re-liquefy the vapor with the ordinary hydrogen. Unfortunately, the efficiency of such a procedure is poor. In this regard, a substantial refrigeration effort is necessary for the conversion of normal hydrogen into para-hydrogen and must be provided in addition to the refrigeration effort necessary for cooling the hydrogen. Thus, when the para-hydrogen refluxes through the cooling means (e.g. a heat exchanger) to the compressor in counter-current to the high pressure gas, the refrigeration effort expended on conversion is not available for cooling the high pressure gas. This is because the reversion of para-hydrogen to normal hydrogen, a step in which the heat yielded to the coolant at low temperature is re-adsorbed, occurs only at room temperature. Therefore, there is a continuous loss of refrigerant effort.

It has also been known to improve the above type of apparatus by forming the expander as a throttle-valve and by employing a heat exchanger downstream of the throttle-valve. In this construction, the hydrogen vapor which remains after expansion is condensed and sub-cooled in the heat exchanger so that the liquid hydrogen can prevent hydrogen vapor from arising in the reservoir as a result of incident heat. Unfortunately, a substantial refrigeration effort must be provided in this case at a low temperature level. Again, this results in a substantial expenditure of energy. Another disadvantage is that the only way of keeping the reservoir pressure constant is by adjustment of the refrigeration effort of the added heat exchanger.

Accordingly, it is an object of the invention to provide an apparatus for producing liquid para-hydrogen which requires a relatively low refrigeration effort.

It is another object of the invention to produce liquid para-hydrogen at reduced cost.

Briefly, the invention provides an apparatus for producing liquid para-hydrogen which includes means for converting a flow of normal hydrogen into a cooled compressed flow of para-hydrogen, an ejector for expanding and at least partially liquefying the cooled flow of hydrogen, a reservoir for receiving the liquefied hydrogen and a suction line connecting a gas space in the reservoir with a suction side of the ejector in order to deliver para-hydrogen vapor to the ejector for liquefying thereof.

The means for converting the flow of normal hydrogen into a cooled compressed flow of para-hydrogen includes a compressor for compressing a flow of normal hydrogen gas, a cooling means downstream of the compressor for cooling the compressed flow of hydrogen and catalysts for converting normal hydrogen in the flow into para-hydrogen.

The apparatus may also include a valve in the suction line and means for controlling the valve in response to the pressure in the reservoir gas space.

These and other objects and advantages of the invention will become more apparent from the following detailed description taken in conjunction with the accompanying drawing wherein:

The FIGURE schematically illustrates an apparatus constructed in accordance with the invention.

Referring to the drawing, the apparatus for producing liquid para-hydrogen has a means for converting a flow of normal hydrogen into a cooled compressed flow of para-hydrogen. As indicated, this means includes a compressor 1 which receives and compresses a flow of normal hydrogen gas from a supply line 2, a cooling means in the form of a heat exchanger 3 downstream of the compressor 1 for cooling the compressed flow of hydrogen and catalysts (not shown) for converting normal hydrogen in the flow into para-hydrogen in known manner.

The heat exchanger 3 serves to cool the compressed flow of hydrogen to a temperature below the inversion temperature and is supplied with a coolant through a line 4 in counter-current relation. The catalysts are in the form of built-in catalysts within the heat exchanger 3 and are of known construction.

The apparatus also has an ejector 5 downstream of the heat exchanger 3 for expanding and at least partially liquefying the cooled flow of hydrogen. In this regard, the cooled hydrogen is expanded from a high pressure to a lower pressure.

The apparatus also has a second cooling means in the form of a heat exchanger 6 downstream of the expander 5 for liquefying residual hydrogen vapor in the expanded flow of hydrogen. In this regard, the mixture of vapor and liquid flowing from the ejector 5 experiences a further cooling so that more liquid hydrogen is formed. This heat exchanger 6 is flowed through by the same coolant as the heat exchanger 3.

A reservoir 7 is located downstream of the heat exchanger 6 for receiving the liquefied hydrogen. As indicated, this reservoir 7 has a valve 8 at a lower end through which the produced liquid hydrogen, consisting mainly of para-hydrogen, can be removed. In addition, the reservoir 7 has a gas or vapor space 9 at the upper end.

A means is also provided for maintaining a substantially constant temperature in the reservoir 7. This means includes a suction line 10 connected to and between a gas space 9 in the reservoir 7 and a suction side 11 of the ejector 5 in order to deliver para-hydrogen vapor to the ejector 5 for liquefying thereof back to normal hydrogen.

In addition, the means for maintaining the temperature includes a value 12 in the suction line 11 and a means in the form of a pressure sensor 13 is provided for controlling the valve 12 in response to the pressure in the reservoir gas space 9. In this way, the sensor 13 serves to control the temperature of the liquid hydrogen in the reservoir. For example, if the pressure within the gas space 9 increases, the pressure sensor 13 serves to more fully open the valve 12 so that more vapor can be delivered to the ejector 5 for liquefaction. Conversely, if the gas pressure decreases, the valve is directed towards a more closed position so that less vapor is delivered to the ejector 5. Thus, there is no heating up and reconversion of the para-hydrogen back to normal hydrogen.

What is claimed is:

1. An apparatus for producing liquid para-hydrogen from normal hydrogen gas comprising a compressor for compressing a flow of normal hydrogen gas;

first cooling means downstream of said compressor for cooling the compressed flow of hydrogen;

catalysts within said cooling means for converting normal hydrogen in the flow into para-hydrogen;

an ejector downstream of said cooling means for expanding and at least partially liquefying the cooled flow of hydrogen, said ejector having a suction side;

second cooling means downstream of said ejector for liquefying residual hydrogen vapor in the expanded flow of hydrogen;

a reservoir downstream of said second cooling means for receiving the liquefied hydrogen; and means for maintaining a substantially constant temperature in said reservoir, said means being connected to and between a gas space in said reservoir and said suction side of said ejector to deliver para-hydrogen vapor to said ejector for liquefying thereof.

2. An apparatus as set forth in claim 1 wherein said means includes a suction line connecting said gas space with said suction side of said ejector, a valve in said suction line and means for controlling said valve in response to the pressure in said reservoir gas space to control the temperature of the liquid hydrogen in said reservoir whereby in response to an increase in pressure in said gas space said valve is opened more fully to deliver more vapor to said ejector for liquefaction.

3. In an apparatus for producing liquid para-hydrogen from normal hydrogen gas, the combination comprising means for converting a flow of normal hydrogen into a cooled compressed flow of para-hydrogen;

an ejector for expanding and at least partially liquefying the cooled flow of hydrogen, said ejector having a suction side;

a reservoir for receiving the liquefied hydrogen; and means for maintaining a substantially constant temperature in said reservoir, said means being connected to and between a gas space in said reservoir and said suction side of said ejector to deliver para-hydrogen vapor to said ejector for liquefying thereof.

4. In an apparatus as set forth in claim 3, the combination which further comprises a cooling means between said ejector and said reservoir for liquefying residual hydrogen vapor in the expanded flow of hydrogen.

* * * * *